(12) United States Patent
Furuta

(10) Patent No.: US 12,026,991 B2
(45) Date of Patent: Jul. 2, 2024

(54) NON-TRANSITORY COMPUTER-READABLE RECORDING MEDIUM, MAP UPDATING METHOD, VEHICLE CONTROL METHOD, AND VEHICLE CONTROL SYSTEM

(71) Applicant: TOYOTA JIDOSHA KABUSHIKI KAISHA, Toyota Aichi-ken (JP)

(72) Inventor: Hiroki Furuta, Sunto-gun Shizuoka-ken (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 127 days.

(21) Appl. No.: 17/864,503

(22) Filed: Jul. 14, 2022

(65) Prior Publication Data
US 2023/0077687 A1 Mar. 16, 2023

(30) Foreign Application Priority Data
Sep. 14, 2021 (JP) .................. 2021-149637

(51) Int. Cl.
B60G 17/0165 (2006.01)
G07C 5/02 (2006.01)

(52) U.S. Cl.
CPC ........... *G07C 5/02* (2013.01); *B60G 17/0165* (2013.01); *B60G 2400/252* (2013.01)

(58) Field of Classification Search
CPC .. G01C 21/32; B60G 17/0165; B60G 17/018; B60G 17/015
See application file for complete search history.

(56) References Cited

U.S. PATENT DOCUMENTS

| | | | | |
|---|---|---|---|---|
| 9,662,955 B2* | 5/2017 | Popham | ............ | B60G 17/0165 |
| 10,828,953 B2* | 11/2020 | Anderson | ............ | F16F 9/512 |
| 11,807,063 B2* | 11/2023 | Furuta | ............ | B60G 17/0165 |
| 2016/0180171 A1* | 6/2016 | Kamata | ............ | G06V 20/56 |
| | | | | 382/103 |
| 2018/0154723 A1* | 6/2018 | Anderson | ............ | H02K 11/33 |
| 2018/0154824 A1* | 6/2018 | Urano | ............ | B60W 50/082 |
| 2021/0080265 A1* | 3/2021 | Zhang | ............ | G01C 21/3837 |
| 2021/0095975 A1* | 4/2021 | Mubarek | ............ | G08G 1/0141 |
| 2022/0161624 A1* | 5/2022 | Hirao | ............ | B60G 17/019 |
| 2022/0379679 A1* | 12/2022 | Eisenmann | ............ | B60G 17/0165 |
| 2023/0077687 A1* | 3/2023 | Furuta | ............ | B60G 17/0182 |
| | | | | 280/5.5 |
| 2023/0204386 A1* | 6/2023 | Kitahara | ............ | G01C 21/32 |
| | | | | 701/450 |

* cited by examiner

*Primary Examiner* — Toan C To
(74) *Attorney, Agent, or Firm* — Dinsmore & Shohl LLP

(57) ABSTRACT

Map data regarding a vertical motion parameter related to a vertical motion of a wheel of a vehicle are provided. The map data have a data structure for a specific area in which a first road and a second road cross with being separated vertically. The data structure for the specific area includes at least one of: first layer map data indicating a correspondence relationship between a horizontal position, a vertical position, and the vertical motion parameter of the first road; and second layer map data indicating a correspondence relationship between a horizontal position, a vertical position, and the vertical motion parameter of the second road.

9 Claims, 17 Drawing Sheets

<FIRST LAYER MAP DATA 200-1>

| LAYER 1 | | |
|---|---|---|
| HORIZONTAL POSITION (X, Y) | VERTICAL POSITION (H) | UNSPRUNG DISPLACEMENT (Zu) |
| X_1a, Y_1a | H_1a | Zu_1a |
| X_1b, Y_1b | H_1b | Zu_1b |
| X_1c, Y_1c | H_1c | Zu_1c |
| ⋮ | ⋮ | ⋮ |

<SECOND LAYER MAP DATA 200-2>

| LAYER 2 | | |
|---|---|---|
| HORIZONTAL POSITION (X, Y) | VERTICAL POSITION (H) | UNSPRUNG DISPLACEMENT (Zu) |
| X_2a, Y_2a | H_2a | Zu_2a |
| X_2b, Y_2b | H_2b | Zu_2b |
| X_2c, Y_2c | H_2c | Zu_2c |
| ⋮ | ⋮ | ⋮ |

200

200

<FIRST LAYER MAP DATA 200-1>

| LAYER 1 | | |
|---|---|---|
| HORIZONTAL POSITION (X, Y) | VERTICAL POSITION (H) | UNSPRUNG DISPLACEMENT (Zu) |
| X_1a, Y_1a | H_1a | Zu_1a |
| X_1b, Y_1b | H_1b | Zu_1b |
| X_1c, Y_1c | H_1c | Zu_1c |
| ⋮ | ⋮ | ⋮ |

<SECOND LAYER MAP DATA 200-2>

| LAYER 2 | | |
|---|---|---|
| HORIZONTAL POSITION (X, Y) | VERTICAL POSITION (H) | UNSPRUNG DISPLACEMENT (Zu) |
| X_2a, Y_2a | H_2a | Zu_2a |
| X_2b, Y_2b | H_2b | Zu_2b |
| X_2c, Y_2c | H_2c | Zu_2c |
| ⋮ | ⋮ | ⋮ |

*FIG. 12*

| HORIZONTAL POSITION (X, Y) | VERTICAL POSITION (H) | UNSPRUNG DISPLACEMENT (Zu) |
|---|---|---|
| X_1a, Y_1a | | Zu_1a |
| X_1b, Y_1b | H_1A | Zu_1b |
| X_1c, Y_1c | | Zu_1c |
| ⋮ | ⋮ | ⋮ |
| X_1d, Y_1d | | Zu_1d |
| X_1e, Y_1e | H_1B | Zu_1e |
| ⋮ | ⋮ | ⋮ |

200

UNSPRUNG DISPLACEMENT MAP

<LAYER MAP DATA 200-0>

| HORIZONTAL POSITION (X, Y) | VERTICAL POSITION (H) | UNSPRUNG DISPLACEMENT (Zu) |
|---|---|---|
| X_a, Y_a | H_a | Zu_a |
| X_b, Y_b | H_b | Zu_b |
| X_c, Y_c | H_c | Zu_c |
| ⋮ | ⋮ | ⋮ |

FIG. 14

<SECOND LAYER MAP DATA 200-2>

| LAYER 2 | | |
|---|---|---|
| HORIZONTAL POSITION (X, Y) | VERTICAL POSITION (H) | UNSPRUNG DISPLACEMENT (Zu) |
| X_2a, Y_2a | H_2a | Zu_2a |
| X_2b, Y_2b | H_2b | Zu_2b |
| X_2c, Y_2c | H_2c | Zu_2c |
| ⋮ | ⋮ | ⋮ |

NON-TRANSITORY COMPUTER-READABLE RECORDING MEDIUM, MAP UPDATING METHOD, VEHICLE CONTROL METHOD, AND VEHICLE CONTROL SYSTEM

CROSS-REFERENCE TO RELATED APPLICATION

This application claims priority to Japanese Patent Application No. 2021-149637 filed on Sep. 14, 2021, the entire contents of which are incorporated by reference herein.

BACKGROUND

Technical Field

The present disclosure relates to map data regarding a parameter related to a vertical motion of a wheel of a vehicle. The present disclosure also relates to generation and update of the map data. Further, the present disclosure relates to vehicle control utilizing the map data.

Background Art

Patent Literature 1 discloses a road surface displacement map that indicates a correspondence relationship between a road surface displacement (road surface unevenness) and a position. By utilizing such the road surface displacement map, vibration suppression control is performed. More specifically, a road surface displacement at a predetermined position ahead of a vehicle is recognized in advance based on the road surface displacement map. A control amount of an active suspension is calculated in advance according to the road surface displacement recognized in advance. Then, the active suspension is controlled at a timing when a wheel passes the predetermined position, and thus the vibration of the vehicle is effectively suppressed.

LIST OF RELATED ART

Patent Literature 1: U.S. Patent Application Publication No. 2018/0154723 (Specification)

SUMMARY

Consider map data regarding a vertical motion parameter related to a vertical motion of a wheel of a vehicle. In Patent Literature 1 described above, a multi-level crossing where different roads cross with being separated vertically at a same horizontal position is not taken into consideration. Therefore, when the vehicle is traveling on a first road at the multi-level crossing, there is a possibility that vehicle control is performed based on the map data of a second road that crosses the first road and is vertically separated from the first road. If the vehicle control is performed based on the map data irrelevant to the road on which the vehicle is traveling, an effect of the vehicle control cannot be obtained as expected.

An object of the present disclosure is to provide map data regarding a vertical motion parameter related to a vertical motion of a wheel of a vehicle, the map data also supporting a multi-level crossing.

Another object of the present disclosure is to provide a technique that can appropriately perform vehicle control utilizing map data regarding a vertical motion parameter related to a vertical motion of a wheel of a vehicle, also in a multi-level crossing.

A first aspect is directed to map data regarding a vertical motion parameter related to a vertical motion of a wheel of a vehicle.

The map data have a data structure for a specific area in which a first road and a second road cross with being separated vertically.

The data structure for the specific area includes at least one of:
first layer map data indicating a correspondence relationship between a horizontal position, a vertical position, and the vertical motion parameter of the first road; and
second layer map data indicating a correspondence relationship between a horizontal position, a vertical position, and the vertical motion parameter of the second road.

A second aspect is directed to a map updating method for updating map data regarding a vertical motion parameter related to a vertical motion of a wheel of a vehicle.

The map updating method includes updating the map data based on time-series data of a wheel position and time-series data of the vertical motion parameter.

The map data have a data structure for a specific area in which a first road and a second road cross with being separated vertically.

The data structure for the specific area includes at least one of:
first layer map data indicating a correspondence relationship between a horizontal position, a vertical position, and the vertical motion parameter of the first road; and
second layer map data indicating a correspondence relationship between a horizontal position, a vertical position, and the vertical motion parameter of the second road.

The updating the map data includes:
determining whether or not layer map data corresponding to a vertical position of the wheel position exist in the map data; and
when the layer map data corresponding to the vertical position of the wheel position exist, selecting and updating layer map data corresponding to the vertical position of the wheel position.

A third aspect is directed to a vehicle control method.

The vehicle control method includes:
acquiring map data regarding a vertical motion parameter related to a vertical motion of a wheel of a vehicle; and
controlling a target vehicle based on the vertical motion parameter acquired from the map data.

The map data have a data structure for a specific area in which a first road and a second road cross with being separated vertically.

The data structure for the specific area includes at least one of:
first layer map data indicating a correspondence relationship between a horizontal position, a vertical position, and the vertical motion parameter of the first road; and
second layer map data indicating a correspondence relationship between a horizontal position, a vertical position, and the vertical motion parameter of the second road.

The controlling the target vehicle in the specific area includes:
determining whether or not layer map data corresponding to a vertical position of the target vehicle exist in the map data; and
when the layer map data corresponding to the vertical position of the target vehicle exist, acquiring the vertical motion parameter from the layer map data corresponding to the vertical position of the target vehicle.

A fourth aspect is directed to a vehicle control system.

The vehicle control system includes one or more processors.

The one or more processors are configured to execute:
acquiring map data regarding a vertical motion parameter related to a vertical motion of a wheel of a vehicle; and
controlling a target vehicle based on the vertical motion parameter acquired from the map data.

The map data have a data structure for a specific area in which a first road and a second road cross with being separated vertically.

The data structure for the specific area includes at least one of:
first layer map data indicating a correspondence relationship between a horizontal position, a vertical position, and the vertical motion parameter of the first road; and
second layer map data indicating a correspondence relationship between a horizontal position, a vertical position, and the vertical motion parameter of the second road.

The controlling the target vehicle in the specific area includes:
determining whether or not layer map data corresponding to a vertical position of the target vehicle exist in the map data; and
when the layer map data corresponding to the vertical position of the target vehicle exist, acquiring the vertical motion parameter from the layer map data corresponding to the vertical position of the target vehicle.

According to the first and second aspects, the map data regarding the vertical motion parameter related to the vertical motion of the wheel of the vehicle is provided. The map data supports a multi-level crossing as well.

According to the third and fourth aspects, it is possible to appropriately perform the vehicle control utilizing the map data regarding the vertical motion parameter related to the vertical motion of the wheel of the vehicle, also in a multi-level crossing.

BRIEF DESCRIPTION OF DRAWINGS

FIG. 12 is a conceptual diagram for explaining an example of an unsprung displacement map regarding a specific area;

FIG. 14 is a conceptual diagram for explaining an example of an unsprung displacement map regarding an area other than a specific area;

FIG. 17 is a conceptual diagram for explaining a modification example of an unsprung displacement map regarding a specific area.

EMBODIMENTS

Embodiments of the present disclosure will be described below with reference to the attached drawings.

1. Suspension and Vertical Motion Parameter

Figure 1:
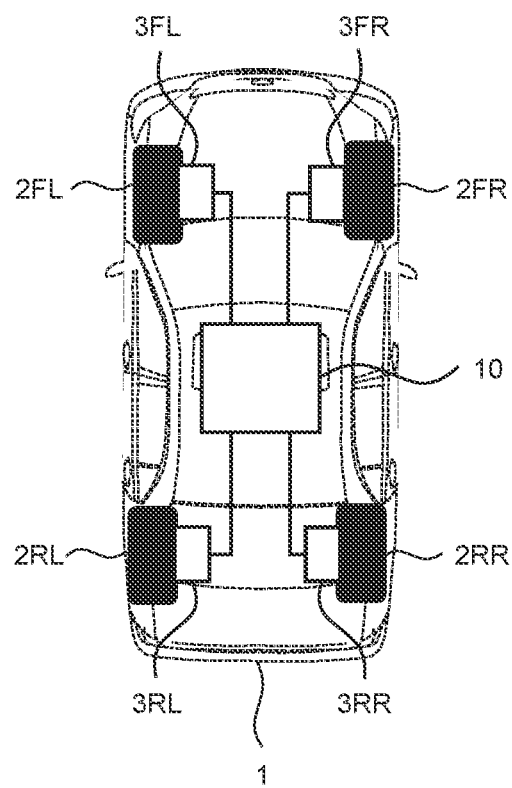
FIG. 1 is a schematic diagram showing a configuration example of a vehicle according to an embodiment.

FIG. 1 is a schematic diagram showing a configuration example of a vehicle 1 according to the present embodiment. The vehicle 1 is provided with wheels 2 and suspensions 3. The wheels 2 include a left front wheel 2FL, a right front wheel 2FR, a left rear wheel 2RL, and a right rear wheel 2RR. Suspensions 3FL, 3FR, 3RL, and 3RR are provided for the left front wheel 2FL, the right front wheel 2FR, the left rear wheel 2RL, and the right rear wheel 2RR, respectively. In the following description, each wheel is referred to as a wheel 2 and each suspension is referred to as a suspension 3, if there is no particular need to distinguish from each other.

Figure 2:
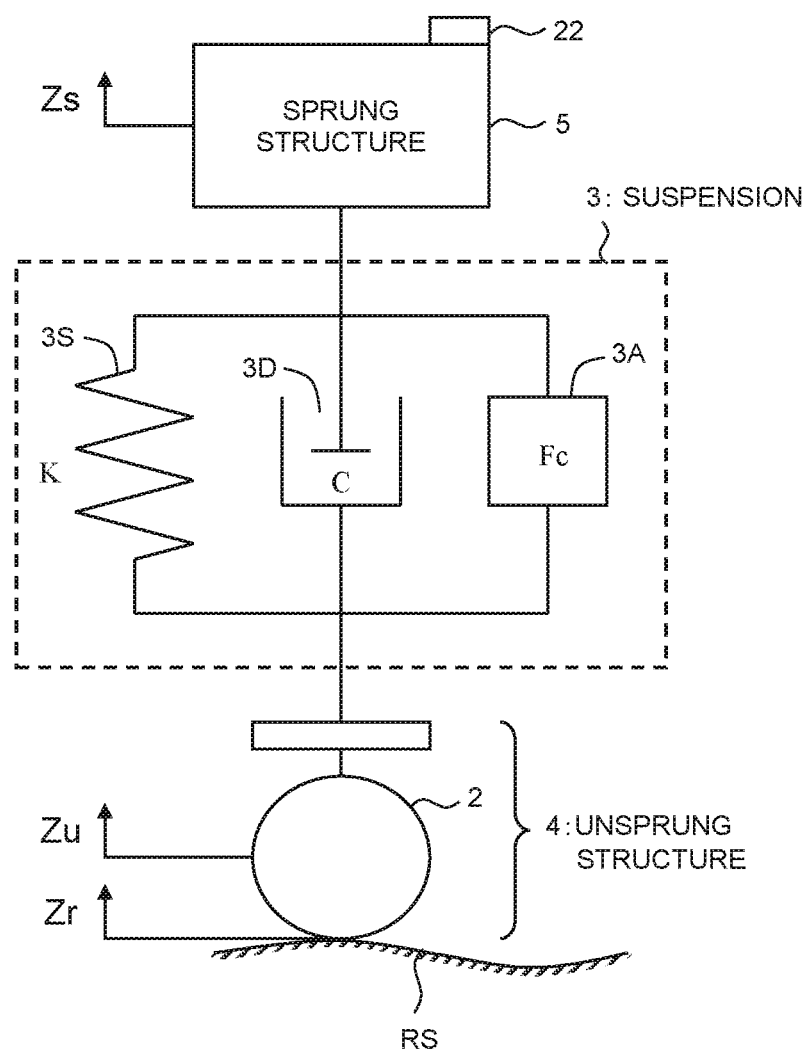
FIG. 2 is a conceptual diagram showing a configuration example of a suspension according to an embodiment.

FIG. 2 is a conceptual diagram showing a configuration example of the suspension 3. The suspension 3 is provided so as to connect between an unsprung structure 4 and a sprung structure 5 of the vehicle 1. The unsprung structure 4 includes the wheel 2. The suspension 3 includes a spring 3S, a damper (shock absorber) 3D, and an actuator 3A. The spring 3S, the damper 3D, and the actuator 3A are provided in parallel between the unsprung structure 4 and the sprung structure 5. A spring constant of the spring 3S is K. A damping coefficient of the damper 3D is C. A damping force of the damper 3D may be variable. The actuator 3A applies a control force Fc in a vertical direction between the unsprung structure 4 and the sprung structure 5.

Here, terms are defined. A road surface displacement Zr is a displacement of a road surface RS in the vertical direction. An unsprung displacement Zu is a displacement of the unsprung structure 4 in the vertical direction. A sprung displacement Zs is a displacement of the sprung structure 5 in the vertical direction. An unsprung velocity Zu' is a velocity of the unsprung structure 4 in the vertical direction. A sprung velocity Zs' is a velocity of the sprung structure 5 in the vertical direction. An unsprung acceleration Z" is an acceleration of the unsprung structure 4 in the vertical direction. A sprung acceleration Zs" is an acceleration of the sprung structure 5 in the vertical direction. It should be noted that a sign of each parameter is positive in a case of upward and is negative in a case of downward.

The wheel 2 moves on the road surface RS. In the following description, a parameter related to a vertical motion of the wheel 2 is referred to as a "vertical motion parameter." Examples of the vertical motion parameter include the road surface displacement Zr, the unsprung displacement Zu, the unsprung velocity Zu', the unsprung acceleration Zu", the sprung displacement Zs, the sprung velocity Zs', the sprung acceleration Zs" described above, and the like. It can also be said that the vertical motion parameter is a "road surface displacement related parameter" that is related to the road surface displacement Zr.

As an example, in the following description, a case where the vertical motion parameter is the unsprung displacement Zu will be considered. When generalizing, the "unsprung displacement" in the following description shall be replaced by the "vertical motion parameter."

Figure 3:
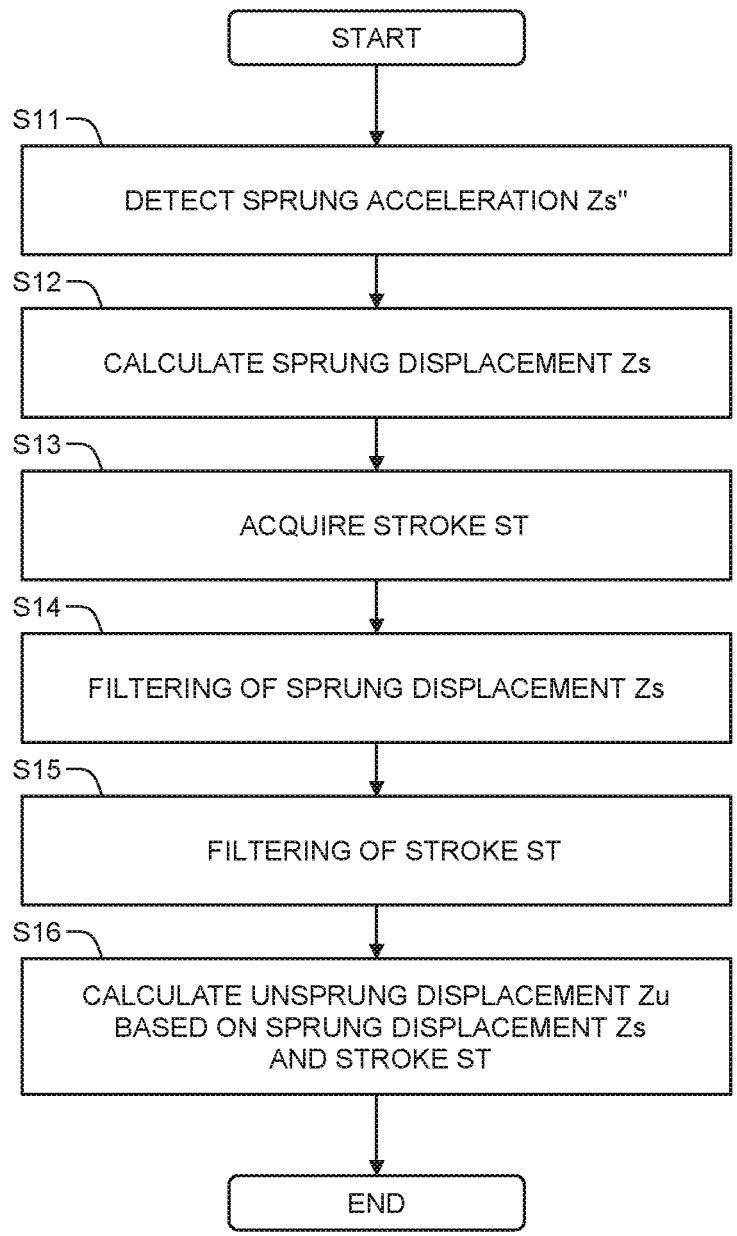
FIG. 3 is a flow chart showing an example of an unsprung displacement calculation process according to an embodiment.

FIG. 3 is a flow chart showing an example of an unsprung displacement calculation process.

In Step S11, the sprung acceleration Zs" is detected by a sprung acceleration sensor 22 installed on the sprung structure 5. In Step S12, the sprung displacement Zs is calculated by double-integrating the sprung acceleration Zs".

In Step S13, a stroke ST (=Zs−Zu) which is a relative displacement between the sprung structure 5 and the unsprung structure 4 is acquired. For example, the stroke ST is detected by a stroke sensor installed on the suspension 3. As another example, the stroke ST may be estimated based on the sprung acceleration Zs" by an observer constructed based on a single-wheel two-degree-of-freedom model.

In Step S14, a filtering process is performed on time-series data of the sprung displacement Zs in order to suppress an influence of a sensor drift and the like. Similarly, in Step S15, a filtering process is performed on time-series data of the stroke ST. For example, the filter is a bandpass filter that passes a signal component of a specific frequency range. The specific frequency range may be set to include an sprung resonance frequency of the vehicle 1. For example, the specific frequency range is from 0.3 Hz to 10 Hz.

In Step S16, a difference between the sprung displacement Zs and the stroke ST is calculated as the unsprung displacement Zu.

Instead of Steps S14 and S15, a filtering process may be performed on time-series data of the unsprung displacement Zu calculated in Step S16.

As yet another example, the unsprung acceleration Zu" may be detected by an unsprung acceleration sensor and the unsprung displacement Zu may be calculated from the unsprung acceleration Zu".

2. Vehicle Control System

2-1. Configuration Example

Figure 4:
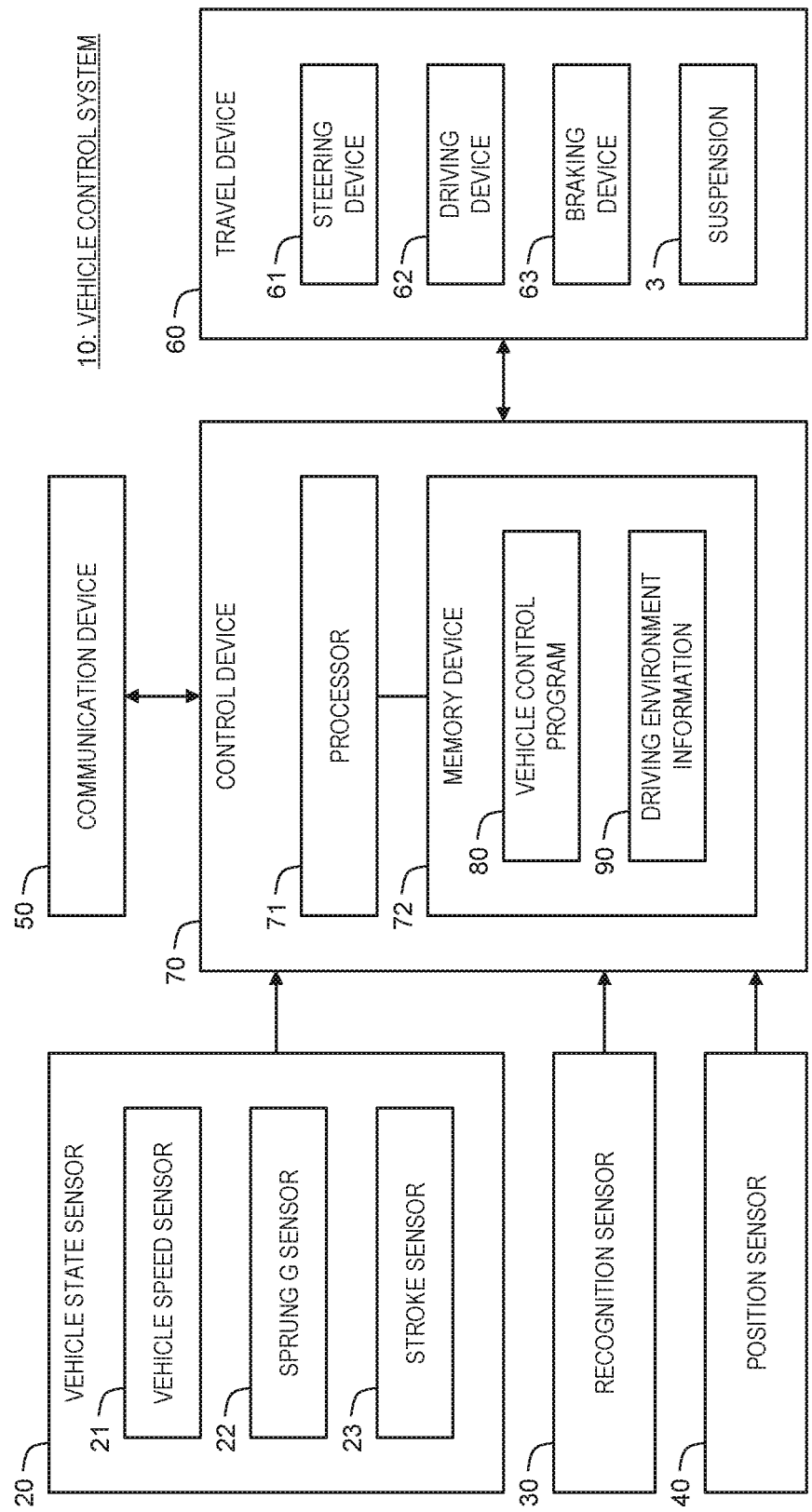
FIG. 4 is a block diagram showing a configuration example of a vehicle control system according to an embodiment.

FIG. 4 is a block diagram showing a configuration example of a vehicle control system 10 according to the present embodiment. The vehicle control system 10 is installed on the vehicle 1 and controls the vehicle 1. The vehicle control system 10 includes a vehicle state sensor 20, a recognition sensor 30, a position sensor 40, a communication device 50, a travel device 60, and a control device 70.

The vehicle state sensor 20 detects a state of the vehicle 1. The vehicle state sensor 20 includes a vehicle speed sensor (wheel speed sensor) 21 that detects a vehicle speed V of the vehicle 1, a sprung acceleration sensor 22 that detects the sprung acceleration Zs", and the like. The vehicle state sensor 20 may include a stroke sensor 23 that detects the stroke ST. The vehicle state sensor 20 may include an unsprung acceleration sensor. In addition, the vehicle state sensor 20 includes a lateral acceleration sensor, a yaw rate sensor, a steering angle sensor, and the like.

The recognition sensor 30 recognizes (detects) a situation around the vehicle 1. Examples of the recognition sensor 30 include a camera, a LIDAR (Laser Imaging Detection and Ranging), a radar, and the like.

The position sensor 40 detects a position and an orientation of the vehicle 1. For example, the position sensor 40 includes a GNSS (Global Navigation Satellite System).

The communication device 50 communicates with the outside of the vehicle 1.

The travel device 60 includes a steering device 61, a driving device 62, a braking device 63, and the suspension 3 (see FIG. 2). The steering device 61 steers the wheel 2. For example, the steering device 61 includes an electric power steering (EPS) device. The driving device 62 is a power source for generating a driving force. Examples of the driving device 62 include an engine, an electric motor, an in-wheel motor, and the like. The braking device 63 generates a braking force.

The control device (controller) 70 is a computer that controls the vehicle 1. The control device 70 includes one or more processors 71 (hereinafter simply referred to as a processor 71) and one or more memory devices 72 (hereinafter simply referred to as a memory devices 72). The processor 71 executes a variety of processing. For example, the processor 71 includes a CPU (Central Processing Unit). The memory device 72 stores a variety of information necessary for the processing by the processor 71. Examples of the memory device 72 include a volatile memory, a non-volatile memory, an HDD (Hard Disk Drive), an SSD (Solid State Drive), and the like. The control device 70 may include one or more ECUs (Electronic Control Units).

A vehicle control program 80 is a computer program for controlling the vehicle 1 and is executed by the processor 71. The vehicle control program 80 is stored in the memory device 72. Alternatively, the vehicle control program 80 may be recorded on a non-transitory computer-readable recording medium. Functions of the control device 70 are implemented by the processor 71 executing the vehicle control program 80.

2-2. Driving Environment Information

Figure 5:
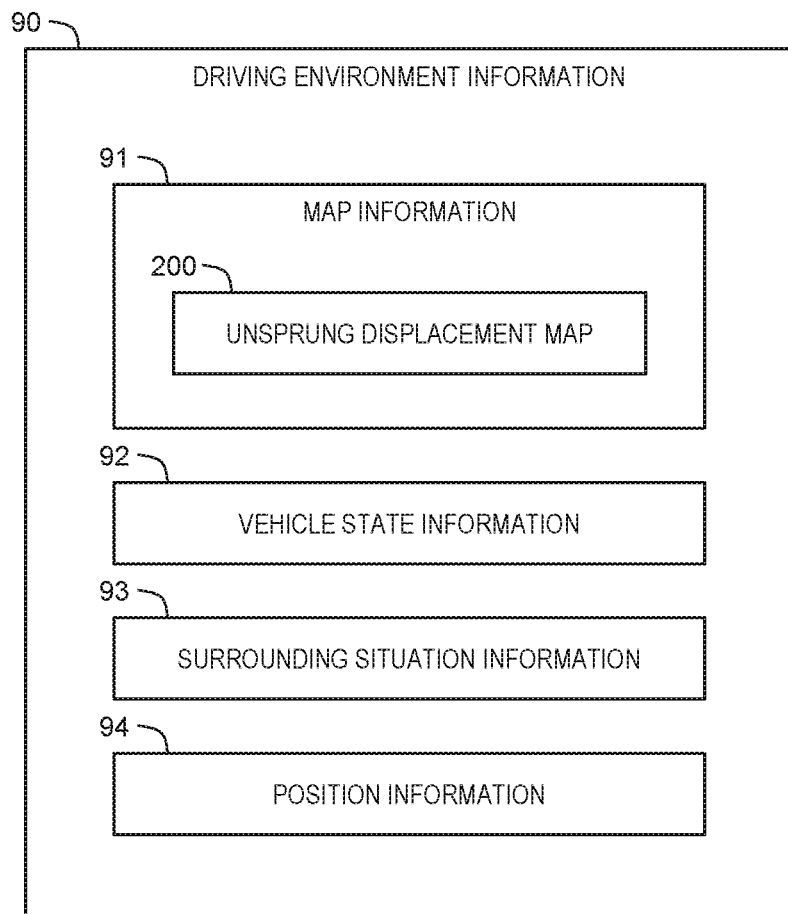
FIG. 5 is a block diagram showing an example of driving environment information according to an embodiment.

FIG. 5 is a block diagram showing an example of driving environment information 90 indicating a driving environment for the vehicle 1. The driving environment information 90 is stored in the memory device 72. The driving environment information 90 includes map information 91, vehicle state information 92, surrounding situation information 93, and position information 94.

The map information 91 includes a general navigation map. The map information 91 may indicate a lane configuration, a road shape, and the like. The map information 91 may include position information of white lines, traffic lights, signs, landmarks, and the like. The map information 91 is obtained from a map database. It should be noted that the map database may be installed on the vehicle 1 or may be stored in an external management server. In the latter case, the control device 70 communicates with the management server to acquire necessary map information 91.

The map information 91 further includes an "unsprung displacement map 200." Details of the unsprung displacement map 200 will be described later.

The vehicle state information 92 is information indicating the state of the vehicle 1. The control device 70 acquires the vehicle state information 92 from the vehicle state sensor 20. For example, the vehicle state information 92 includes the vehicle speed V, the sprung acceleration Zs", the stroke ST, the lateral acceleration, the yaw rate, the steering angle, and the like. The vehicle speed V may be calculated from the vehicle position detected by the position sensor 40. The control device 70 may calculate the unsprung displacement Zu by the method shown in FIG. 3. In that case, the vehicle state information 92 also includes the unsprung displacement Zu calculated by the control device 70.

The surrounding situation information 93 is information indicating the situation around the vehicle 1. The control device 70 recognizes the situation around the vehicle 1 by using the recognition sensor 30 to acquire the surrounding situation information 93. For example, the surrounding situation information 93 includes image information captured by the camera. As another example, the surrounding situation information 93 includes point cloud information obtained by the LIDAR.

The surrounding situation information 93 further includes "object information" regarding an object around the vehicle 1. Examples of the object include a pedestrian, a bicycle, another vehicle (e.g., a preceding vehicle, a parked vehicle, and the like), a road structure (e.g., a white line, a curb, a guardrail, a wall, a median strip, a roadside structure, and the like), a sign, a pole, an obstacle, and the like. The object information indicates a relative position and a relative velocity of the object relative to the vehicle 1. For example, analyzing the image information captured by the camera makes it possible to identify an object and calculate the relative position of the object. It is also possible to identify an object and acquire the relative position and the relative velocity of the object based on the point cloud information obtained by the LIDAR.

The position information 94 is information indicating the position and the orientation of the vehicle 1. The position includes a horizontal position and a vertical position. For example, the horizontal position is defined by a latitude and a longitude. The vertical position is defined by an altitude. Examples of the altitude include a height above sea level, a geoid height, an ellipsoid height, and the like. The control device 70 acquires the position information 94 from a result of measurement by the position sensor 40 such as a GNSS. As another example, the control device 70 may acquire the position information 94 by dead reckoning. As still another example, the control device 70 may acquire high-precision position information 94 by a well-known localization process utilizing the object information and the map information 91.

2-3. Vehicle Control

The control device 70 executes vehicle travel control that controls travel of the vehicle 1. The vehicle travel control includes steering control, driving control, and braking control. The control device 70 executes the vehicle travel control by controlling the travel device 60 (i.e., the steering device 61, the driving device 62, and the braking device 63). The control device 70 may execute driving assist control that assists driving of the vehicle 1 based on the driving environment information 90. Examples of the driving assistance control include lane keeping control, collision avoidance control, autonomous driving control, and the like.

Furthermore, the control device 70 controls the suspension 3. Typically, the control device 70 controls the suspension 3 to perform vibration suppression control that suppresses vibration of the vehicle 1. For example, the control device 70 controls the actuator 3A to generate the control force Fc in the vertical direction between the unsprung structure 4 and the sprung structure 5 (see FIG. 2). As another example, the control device 70 may variably control the damping force of the damper 3D. The vibration suppression control includes "preview control" which will be described later.

3. Map Management System 3-1. Configuration Example

Figure 6:
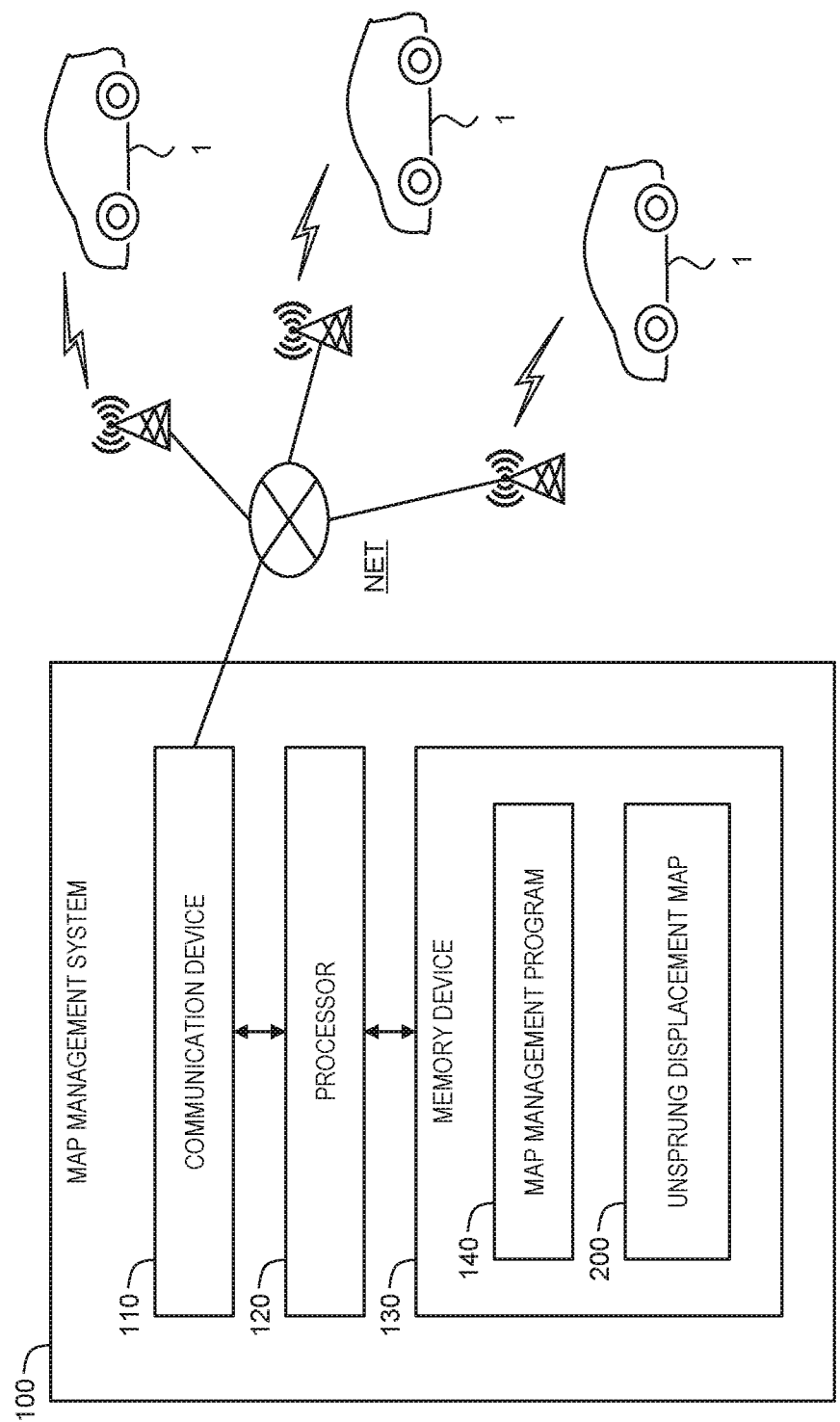
FIG. 6 is a block diagram showing a configuration example of a map management system according to an embodiment.

FIG. 6 is a block diagram showing a configuration example of a map management system 100 according to the present embodiment. The map management system 100 is a computer that manages a variety of map information. Managing the map information includes generating, updating, providing, distributing the map information, and the like. Typically, the map management system 100 is a management server on cloud. The map management system 100 may be a distributed system in which a plurality of servers perform distributed processing.

The map management system 100 includes a communication device 110. The communication device 110 is connected to a communication network NET. For example, the communication device 110 communicates with a lot of vehicles 1 via the communication network NET.

The map management system 100 further includes one or more processors 120 (hereinafter simply referred to as a processor 120) and one or more memory devices 130 (hereinafter simply referred to as a memory device 130). The processor 120 executes a variety of information processing. For example, the processor 120 includes a CPU. The memory device 130 stores a variety of map information. In addition, the memory device 130 stores a variety of information necessary for the processing by the processor 120. Examples of the memory device 130 include a volatile memory, a non-volatile memory, an HDD, an SSD, and the like. The map information may be recorded on a non-transitory computer-readable recording medium.

A map management program 140 is a computer program for the map management and is executed by the processor 120. The map management program 140 is stored in the memory device 130. Alternatively, the map management program 140 may be recorded on a non-transitory computer-readable recording medium. Functions of the map management system 100 are implemented by the processor 120 executing the map management program 140.

The processor 120 communicates with the vehicle control system 10 of the vehicle 1 via the communication device 110. The processor 120 collects a variety of information from the vehicle control system 10, and generates and updates the map information based on the collected information. Moreover, the processor 120 distributes the map information to the vehicle control system 10. Furthermore, the processor 120 provides the map information in response to a request from the vehicle control system 10.

3-2. Unsprung Displacement Map

One of the map information managed by the map management system 100 is the "unsprung displacement map (vertical motion parameter map) 200." The unsprung displacement map 200 is a map regarding the unsprung displacement Zu (vertical motion parameter). The unsprung displacement map 200 is stored in the memory device 130. The unsprung displacement map 200 may be recorded on a non-transitory computer-readable recording medium.

Figure 7:
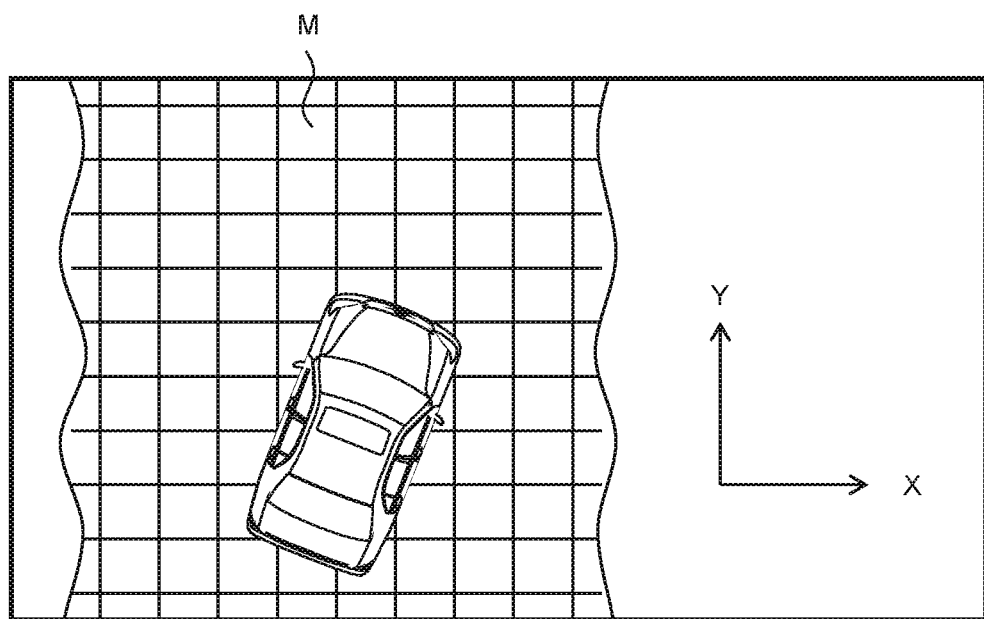
FIG. 7 is a conceptual diagram for explaining an unsprung displacement map according to an embodiment.

FIG. 7 is a conceptual diagram for explaining the unsprung displacement map 200. An XY plane represents a horizontal plane. For example, an absolute coordinate system in the horizontal plane is defined by a latitude direction and a longitude direction, and a horizontal position is defined by a latitude and a longitude. The unsprung displacement map 200 indicates at least a correspondence relationship between the horizontal position (X, Y) and the unsprung displacement Zu. In other words, the unsprung displacement map 200 expresses the unsprung displacement Zu as a function of at least the horizontal position (X, Y). It should be noted that the unsprung displacement map 200 considering a vertical position will be described in detail later.

A road area may be segmented in a mesh pattern on the horizontal plane. That is, the road area may be segmented into a plurality of unit areas M on the horizontal plane. A unit area M is, for example, a square. The square has a side length of, for example, 10 cm. The unsprung displacement map 200 indicates a correspondence relationship between the position of the unit area M and the unsprung displacement Zu. The position of the unit area M may be defined by a representative position (e.g., a center position) of the unit area M, or may be defined by a range (a latitude range and a longitude range) of the unit area M. The unsprung displacement Zu of the unit area M is, for example, an average value of the unsprung displacements Zu acquired within the unit area M. The smaller the unit area M is, the higher a resolution of the unsprung displacement map 200 is.

3-3. Map Generating/Updating Process

The processor 120 collects information from a lot of vehicles 1 via the communication device 110. The processor 120 then generates and updates the unsprung displacement map 200 based on the information collected from the lot of vehicles 1. Hereinafter, an example of the map generating/updating process will be described in more detail.

The position in the unsprung displacement map 200 is a position through which the wheel 2 has passed. The position of each wheel 2 is calculated based on the position information 94 described above. More specifically, a relative positional relationship between a reference point of the vehicle position in the vehicle 1 and each wheel 2 is known information. Based on the relative positional relationship and the vehicle position indicated by the position information 94, it is possible to calculate the position of each wheel 2.

The unsprung displacement Zu is calculated by the method as shown in FIG. 3. That is, the sprung displacement Zs and the stroke ST are acquired by the use of the vehicle state sensor 20 installed on the vehicle 1. The sprung displacement Zs and the stroke ST are referred to as "sensor-based information" for convenience sake. The unsprung displacement Zu is calculated based on the sensor-based information.

For example, while the vehicle 1 is traveling, the control device 70 of the vehicle control system 10 calculates the unsprung displacement Zu in real time based on the sensor-based information. Further, the control device 70 associates the wheel position with the unsprung displacement Zu of the same timing. Then, the control device 70 transmits a set of time-series data of the wheel position and time-series data of the unsprung displacement Zu to the map management system 100. The processor 120 of the map management system 100 generates and updates the unsprung displacement map 200 based on the time-series data of the wheel position and the time-series data of the unsprung displacement Zu.

As another example, the control device 70 of the vehicle control system 10 associates the wheel position with the sensor-based information of the same timing. Then, the control device 70 transmits a set of time-series data of the wheel positions and time-series data of the sensor-based information to the map management system 100. The processor 120 of the map management system 100 calculates the unsprung displacement Zu based on the received sensor-based information. Further, the processor 120 generates and updates the unsprung displacement map 200 based on the time-series data of the wheel position and the time-series data of the unsprung displacement Zu.

It should be noted that when the unsprung displacement Zu is calculated in the map management system 100, it is possible to perform the filtering process by utilizing a zero-phase filter, because there is no constraint of the processing time. Utilizing the zero-phase filter makes it possible to prevent a "phase shift."

Figure 8:
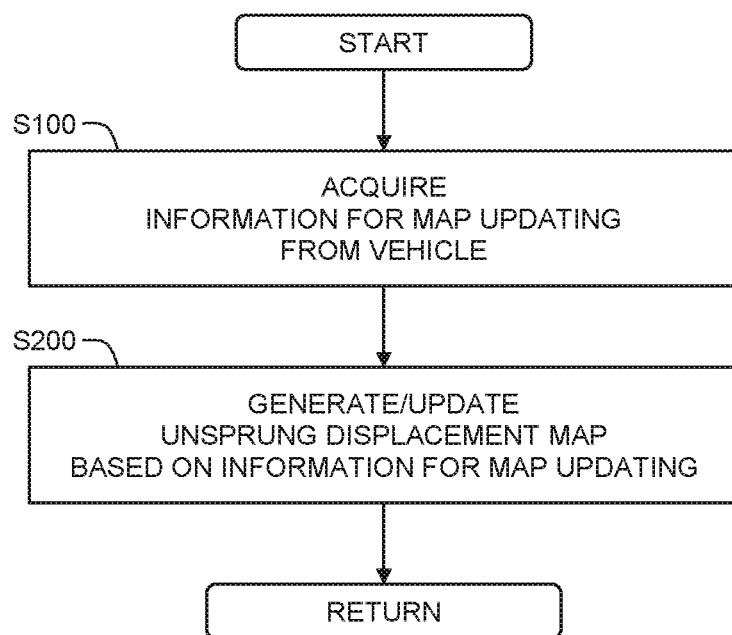
FIG. 8 is a flow chart summarizing a map generating/updating process according to an embodiment.

FIG. 8 is a flow chart summarizing the map generating/updating process according to the present embodiment.

In Step S100, the processor 120 of the map management system 100 acquires "information for map updating" from the vehicle 1 (i.e., the vehicle control system 10) via the communication device 110. The information for map updating includes the time-series data of the position (the wheel position) of the vehicle 1. In addition, the information for map updating includes the time-series data of the sensor-based information (e.g., the sprung displacement Zs, the stroke ST) necessary for calculating the unsprung displacement Zu. Alternatively, the information for map updating may include the time-series data of the unsprung displacement Zu calculated by the control device 70 of the vehicle control system 10.

In Step S200, the processor 120 of the map management system 100 generates/updates the unsprung displacement map 200 based on the information for map updating.

3-4. Modification Example

The vehicle control system 10 of the vehicle 1 may hold a database of the unsprung displacement map 200 and generate/update its own unsprung displacement map 200. That is to say, the map management system 100 may be included in the vehicle control system 10.

4. Preview Control Utilizing Unsprung Displacement Map

The control device 70 of the vehicle control system 10 communicates with the map management system 100 via the communication device 50. The control device 70 acquires the unsprung displacement map 200 of an area including a current position of the vehicle 1 from the map management system 100. The unsprung displacement map 200 is stored in the memory device 72. Then, based on the unsprung displacement map 200, the control device 70 executes "preview control" which is a kind of the vibration suppression control.

Figure 9:
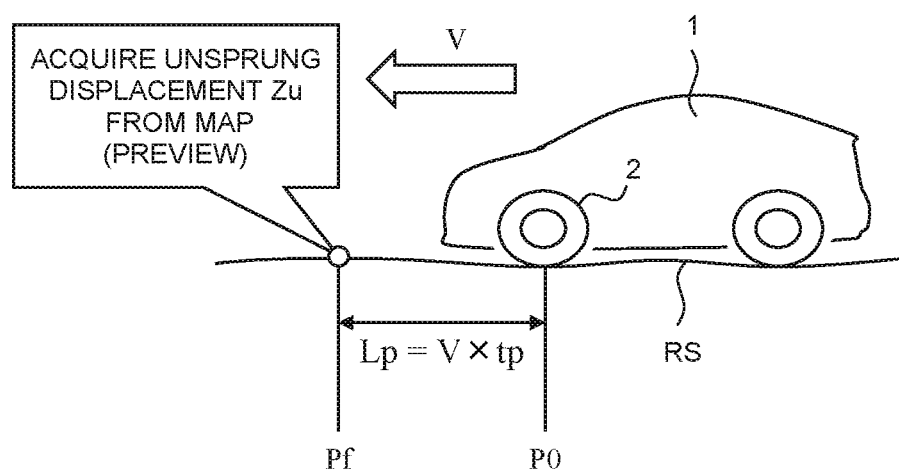
FIG. 9 is a conceptual diagram for explaining preview control utilizing an unsprung displacement map according to an embodiment.
Figure 10:
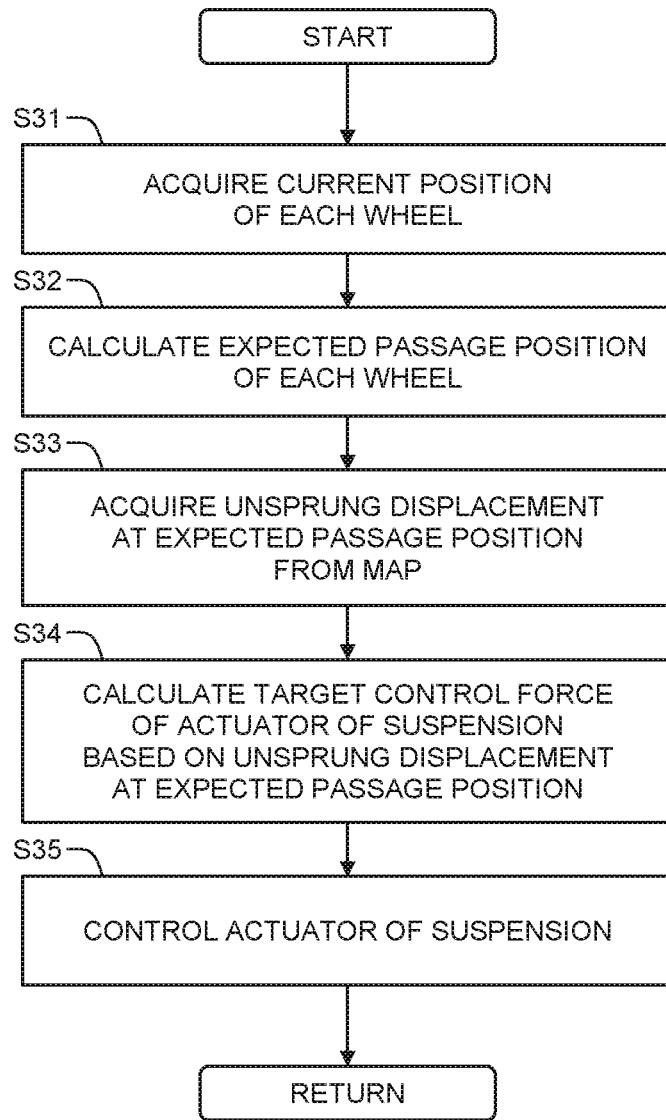
FIG. 10 is a flow chart showing preview control utilizing an unsprung displacement map according to an embodiment.

FIG. 9 is a conceptual diagram for explaining the preview control. FIG. 10 is a flow chart showing the preview control. The preview control will be described with reference to FIGS. 9 and 10.

In Step S31, the control device 70 acquires a current position P0 of each wheel 2. The relative positional relationship between the reference point of the vehicle position in the vehicle 1 and each wheel 2 is known information. Based on the relative positional relationship and the vehicle position indicated by the position information 94, it is possible to calculate the position of each wheel 2.

In Step S32, the control device 70 calculates an expected passage position Pf of the wheel 2 after a preview time tp. For example, the preview time tp is set to be equal to or more than a time required for computation processing and communication processing required to actuate the actuator 3A of the suspension 3. The preview time tp may be fixed or may be variable depending on a situation. A preview distance Lp is given by a product of the preview time tp and the vehicle speed V. The expected passage position Pf is a position the preview distance Lp ahead of the current position P0. As a modification example, the control device 70 may calculate an expected travel route based on the vehicle speed V and the steering angle of the wheel 2 and then calculate the expected passage position Pf based on the expected travel route.

In Step S33, the control device 70 reads the unsprung displacement Zu at the expected passage position Pf from the unsprung displacement map 200.

In Step S34, the control device 70 calculates a target control force Fc_t of the actuator 3A of the suspension 3 based on the unsprung displacement Zu at the expected passage position Pf. For example, the target control force Fc_t is calculated as follows.

An equation of motion regarding the sprung structure 5 (see FIG. 2) is expressed by the following Equation (1).

[Equation 1]

$$m \cdot Zs'' = C(Zu' - Zs') + K(Zu - Zs) - Fc \quad (1)$$

In Equation (1), m is a mass of the sprung structure 5, C is the damping coefficient of the damper 3D, K is the spring constant of the spring 3S, Fc is the control force Fc in the vertical direction generated by the actuator 3A. When vibration of the sprung structure 5 is completely canceled by the control force Fc (i.e., Zs''=0, Zs'=0, Zs=0), the control force Fc is expressed by the following Equation (2).

[Equation 2]

$$Fc = C \cdot Zu' + K \cdot Zu \quad (2)$$

The control force Fc that at least brings about the vibration suppression effect is expressed by the following Equation (3).

[Equation 3]

$$Fc = \alpha \cdot C \cdot Zu' + \beta \cdot K \cdot Zu \quad (3)$$

In Equation (3), a gain α is greater than 0 and equal to or less than 1, and a gain β also is greater than 0 and equal to or less than 1. When the derivative term in Equation (3) is omitted, the control force Fc that at least brings about the vibration suppression effect is expressed by the following Equation (4).

[Equation 4]

$$Fc = \beta \cdot K \cdot Zu \quad (4)$$

The control device 70 calculates the target control force Fc_t in accordance with the above-described Equation (3) or Equation (4). That is, the control device 70 calculates the target control force Fc_t by substituting the unsprung displacement Zu (second unsprung displacement Zu2) at the expected passage position Pf into Equation (3) or Equation (4).

In Step S35, the control device 70 controls the actuator 3A to generate the target control force Fc_t at a timing when the wheel 2 passes the expected passage position Pf. The timing at which the wheel 2 passes the expected passage position Pf can be recognized from the preview time tp.

The preview control utilizing the unsprung displacement map 200 described above makes it possible to effectively suppress the vibration of the vehicle 1 (the sprung structure 5).

5. Unsprung Displacement Map Considering Multi-Level Crossing

Figure 11:
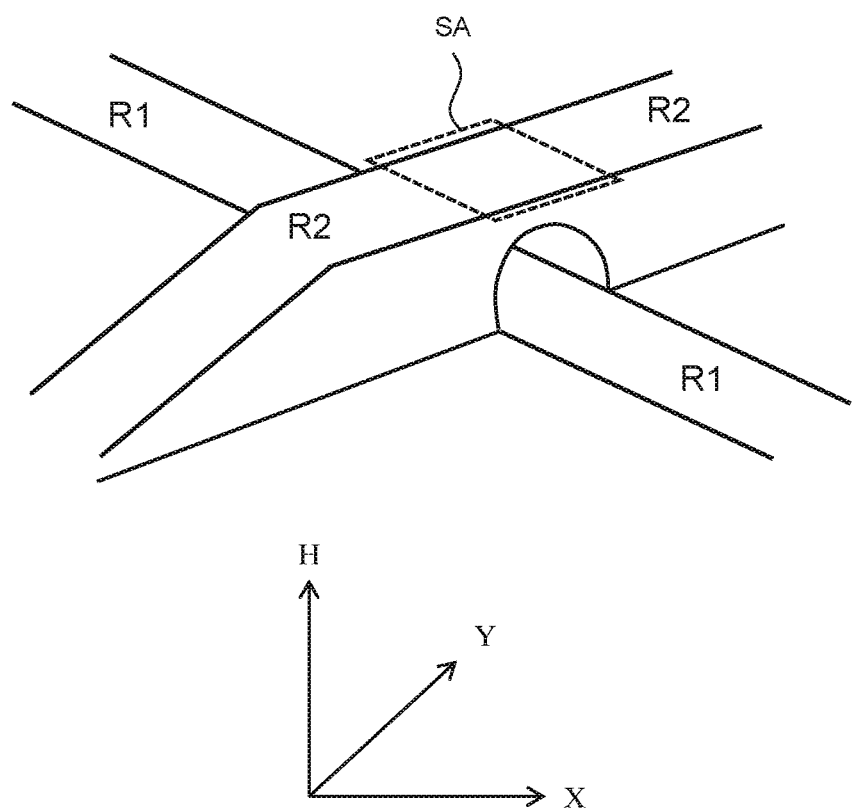
FIG. 11 is a schematic diagram for explaining a multi-level crossing.

FIG. 11 is a schematic diagram for explaining a multi-level crossing. The XY plane represents the horizontal plane. A horizontal position (X, Y) is a position in the horizontal plane. A vertical position H is a position in a vertical direction orthogonal to the horizontal plane. For example, the horizontal position (X, Y) is defined by a latitude and a longitude. The vertical position H is defined by an altitude. Examples of the altitude include a height above sea level, a geoid height, an ellipsoid height, and the like.

As shown in FIG. 11, a first road R1 and a second road R2 cross (intersect) with each other and are vertically separated from each other. An area in which the first road R1 and the second road R2 cross with being separated vertically is hereinafter referred to as a "specific area SA." It should be noted that two roads R1 and R2 cross with being separated vertically in the example shown in FIG. 11, and the same applies to a case where three or more roads cross with being separated vertically.

Regarding such the multi-level crossing (grade separation), the inventor of the present application has recognized the following problem.

As a first comparative example, let us consider a case where the unsprung displacement map 200 is a two-dimensional map that does not include information on the vertical position H and merely indicates a correspondence relationship between the horizontal position (X, Y) and the unsprung displacement Zu. In this case, there is a possibility that the vehicle control such as the preview control in the specific area SA is performed based on the unsprung displacement map 200 of the second road R2, even though the vehicle 1 is traveling on the first road R1. If the vehicle control is performed based on the unsprung displacement map 200 irrelevant to the road on which the vehicle 1 is traveling, an effect of the vehicle control cannot be obtained as expected.

As a second comparative example, let us consider a case where the unsprung displacement map 200 is a complete three-dimensional map. In this case, a data amount of the unsprung displacement map 200 becomes enormous. This is not preferable in terms of consumption of storage resources, communication resources, and computational resources. Moreover, it is complicated to discriminate between the road surface displacement Zr and the vertical position H.

In view of the above, the unsprung displacement map 200 according to the present embodiment has the following feature.

5-1. Data Structure of Unsprung Displacement Map

FIG. 12 is a conceptual diagram for explaining an example of the unsprung displacement map 200 for the specific area SA including the multi-level crossing. A data structure of the unsprung displacement map 200 for the specific area SA includes first layer map data 200-1 and second layer map data 200-2. The first layer map data 200-1 indicates a correspondence relationship between the horizontal position (X, Y), the vertical position H, and the unsprung displacement Zu of the first road R1. On the other hand, the second layer map data 200-2 indicates a correspondence relationship between the horizontal position (X, Y), the vertical position H, and the unsprung displacement Zu of the second road R2. That is, the unsprung displacement map 200 for the specific area SA is multi-layered.

As shown in FIG. 7 described above, a road area may be segmented in a mesh pattern on the horizontal plane. That is, the road area may be segmented into a plurality of unit areas M on the horizontal plane. A unit area M is, for example, a square. The square has a side length of, for example, 10 cm. Each layer map data 200-$i$ ($i$=1, 2) indicates a correspondence relationship between the horizontal position (X, Y) of the unit area M, the vertical position H of the i-th road Ri in the unit area M, and the unsprung displacement Zu of the i-th road Ri in the unit area M. The horizontal position (X, Y) of the unit area M may be defined by a representative horizontal position (e.g., a center position) of the unit area M, or may be defined by a horizontal range (a latitude range and a longitude range) of the unit area M. The vertical position H of the i-th road Ri in the unit area M may be defined by a representative vertical position (e.g., an average value) of the i-th road Ri in the unit area M, or may be defined by a vertical range (an altitude range) of the i-th road Ri in the unit area M. The unsprung displacement Zu of the i-th road Ri in the unit area M is, for example, an average value of the unsprung displacements Zu of the i-th road Ri acquired within the unit area M. The smaller the unit area M is, the higher a resolution of the layer map data 200-$i$ is.

As described above, the unsprung displacement map 200 for the specific area SA includes the layer map data 200-$i$ for each road. In other words, the unsprung displacement map 200 is not a complete three-dimensional map, and the layer map data 200-$i$ is prepared only for the vertical position H at which the road exists. Therefore, the data amount of the unsprung displacement map 200 is reduced as compared with the case of the complete three-dimensional map.

Figure 13:
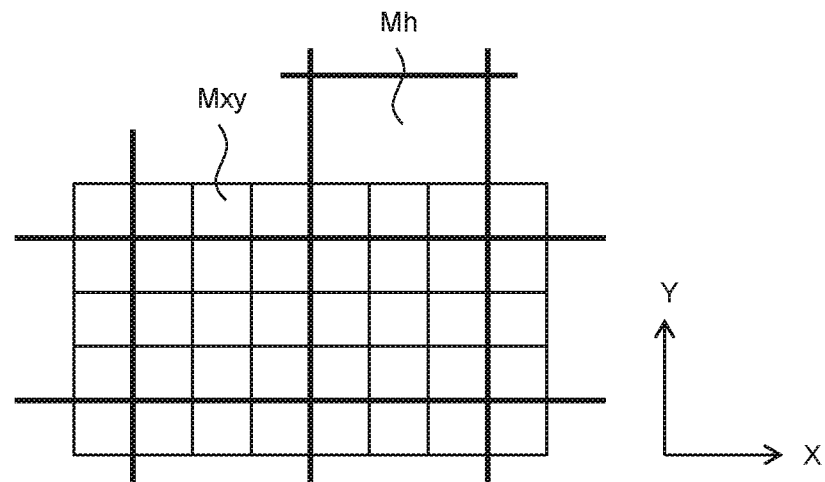
FIG. 13 is a conceptual diagram for explaining another example of an unsprung displacement map regarding a specific area.

In the layer map data 200-$i$, a mesh width of the horizontal position (X, Y) and a mesh width of the vertical position H may be different from each other. More specifically, as shown in FIG. 13, the horizontal position (X, Y) is defined for each first unit area Mxy in the horizontal plane. On the other hand, the vertical position H is defined for each second unit area Mh in the horizontal plane. It is unlikely that the vertical position H changes by several meters concurrently with a change in the horizontal position (X, Y) of the road by several meters. Therefore, the second unit area Mh may be set to be larger than the first unit area Mxy. For example, the first unit area Mxy is a square having a side length of 10 cm, and the second unit area Mh is a square having a side length of 100 cm. Increasing the mesh width of the vertical position H to reduce the resolution makes it possible to further reduce the data amount of the unsprung displacement map 200.

FIG. 14 is a conceptual diagram for explaining an example of the unsprung displacement map 200 for an area other than the specific area SA. A data structure of the unsprung displacement map 200 for the area other than the specific area SA includes only a single piece of layer map data 200-0. The layer map data 200-0 indicates a correspondence relationship between the horizontal position (X, Y), the vertical position H, and the unsprung displacement Zu of the road. Since only the single piece of layer map data 200-0 is prepared for the area other than the specific area SA, the data amount is reduced.

As a modification example, the information of the vertical position H may be omitted from the layer map data 200-0 for the area other than the specific area SA. This makes it possible to further reduce the data amount of the unsprung displacement map 200.

As described above, according to the present embodiment, the unsprung displacement map 200 that supports the multi-level crossing as well is provided. Furthermore, the data amount of the unsprung displacement map 200 is reduced as compared with the case of a complete three-dimensional map.

5-2. Map Generating/Updating Process

Next, the map generating/updating process considering the multi-level crossing will be described. As shown in FIG. 8 described above, in Step S100, the processor 120 of the map management system 100 acquires the information for map updating from the vehicle 1 (i.e., the vehicle control system 10). The information for map updating includes the position information 94 indicating the horizontal position (X, Y) and the vertical position H of the vehicle 1. In addition, the information for map updating includes information (e.g., the wheel position, the sensor-based information, the unsprung displacement Zu, and the like) necessary for updating the unsprung displacement map 200. In Step S200 after Step S100, the processor 120 generates/updates the unsprung displacement map 200 based on the information for map updating.

Figure 15:
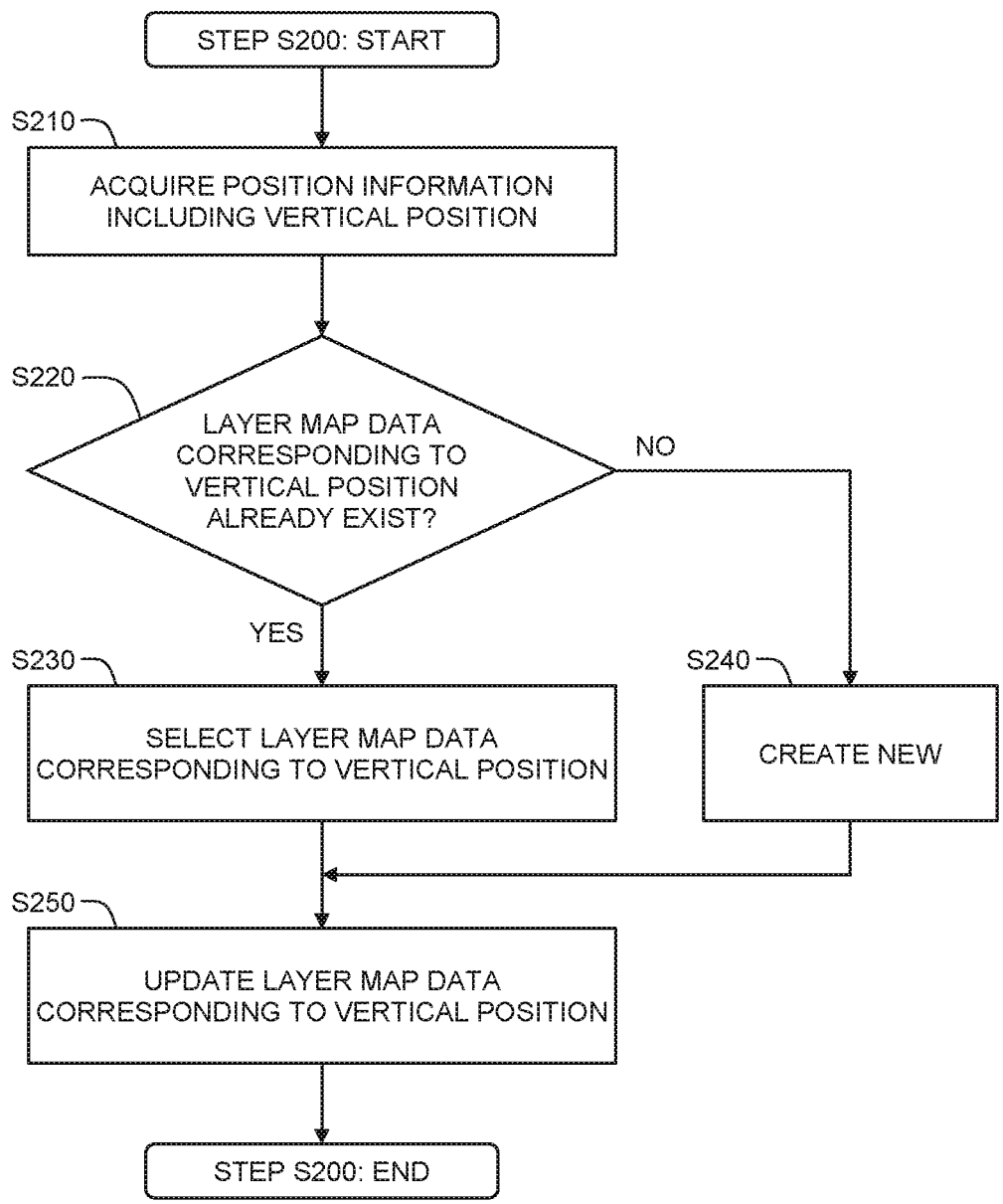
FIG. 15 is a flow chart showing a map generating/updating process for a specific area.

FIG. 15 is a flow chart showing an example of Step S200 for the specific area SA.

In Step S210, the processor 120 acquires the position information 94 including the vertical position H of the vehicle 1 from the information for map updating. It should be noted that since the relative positional relationship between the reference point of the vehicle position and each wheel 2 is known information, the position of the vehicle 1 and the position of the wheel 2 are treated as equivalent in the following description.

In Step S220, the processor 120 determines whether or not layer map data 200-$j$ ($j$=1 or 2) corresponding to the vertical position H of the vehicle 1 (wheel 2) already exist in the unsprung displacement map 200. This determination is possible by comparing the vertical position H of the vehicle 1 and the vertical position H included in the layer map data 200-$k$ already registered in the unsprung displacement map 200. Here, since the vertical position H of the vehicle 1 may include an error, the comparison between the vertical positions H may be made in consideration of a certain error range (e.g., ±2 m). Since a difference in the altitude between the first road R1 and second road R2 that cross each other is sufficiently larger than a general vehicle height, an erroneous determination is not caused even when an error range of about ±2m is taken into consideration. When the layer map data 200-$j$ corresponding to the vertical position H of the vehicle 1 already exist in the unsprung displacement map 200 (Step S220; Yes), the processing proceeds to Step S230. Otherwise (Step S220; No), the processing proceeds to Step S240.

In Step S230, the processor 120 selects the existing layer map data 200-$j$ corresponding to the vertical position H of the vehicle 1.

In Step S240, the processor 120 newly creates a layer map data 200-$j$ corresponding to the vertical position H of the vehicle 1.

In Step S250, the processor 120 updates the layer map data 200-$j$ corresponding to the vertical position H of the vehicle 1 based on the information for map updating.

5-3. Vehicle Control Process

Figure 16:
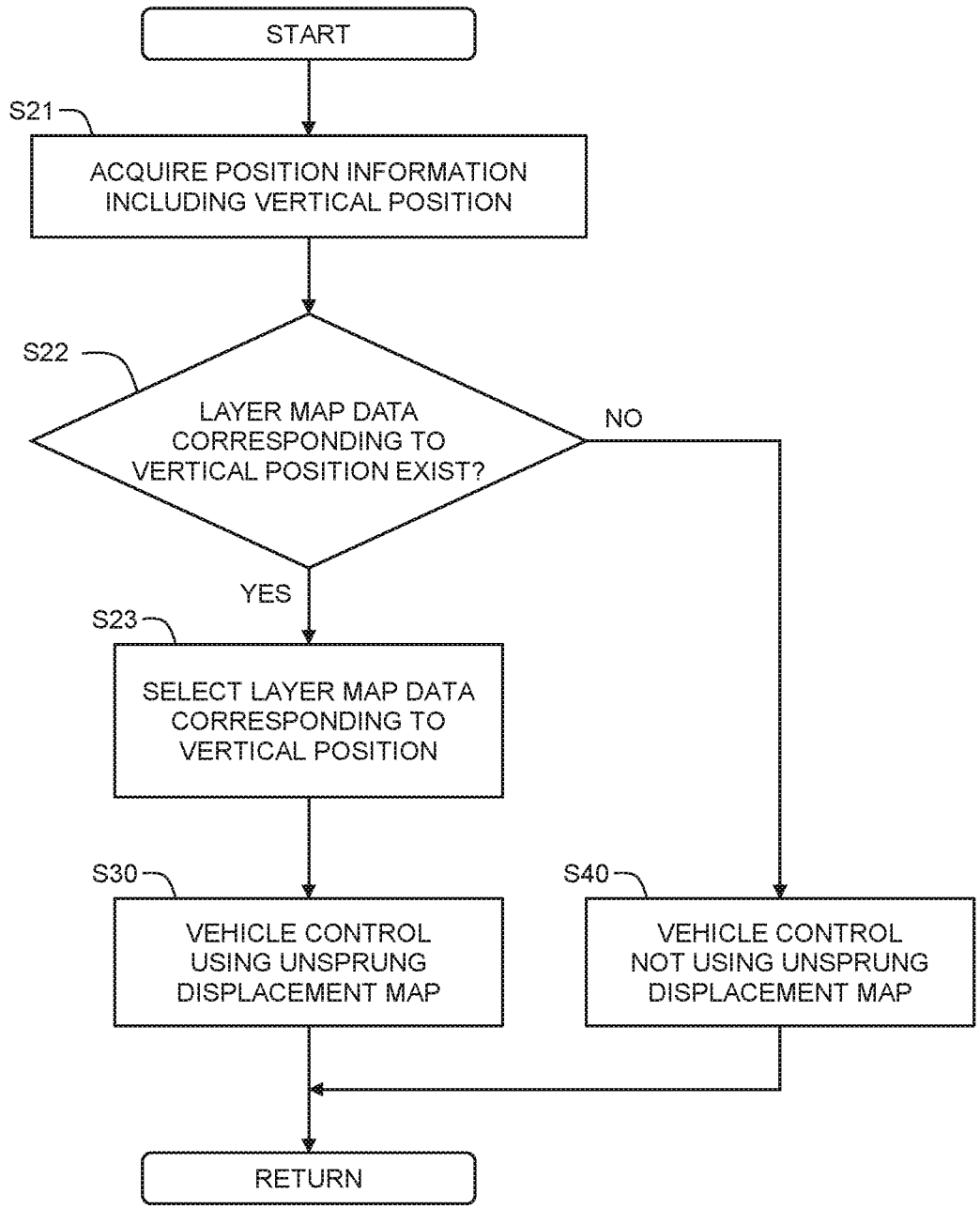
FIG. 16 is a flow chart showing a vehicle control process in a specific area.

FIG. 16 is a flow chart showing a vehicle control process in the specific area SA. For convenience sake, the vehicle 1 as a target of the vehicle control process is hereinafter referred to as a "target vehicle 1T."

In Step S21, the control device 70 of the vehicle control system 10 acquires the position information 94. The position information 94 includes the horizontal position (X, Y) and the vertical position H of the target vehicle 1T.

In Step S22, the control device 70 determines whether or not layer map data 200-$j$ ($j$=1 or 2) corresponding to the vertical position H of the target vehicle 1T (wheel 2) already exist in the unsprung displacement map 200. This determination is possible by comparing the vertical position H of the target vehicle 1T and the vertical position H included in the layer map data 200-$k$ already registered in the unsprung displacement map 200. Here, since the vertical position H of the target vehicle 1T may include an error, a range of the vertical position H including a certain error range (e.g., ±2m) may be used for the comparison. Since a difference in the altitude between the first road R1 and second road R2 that cross each other is sufficiently larger than a general vehicle height, an erroneous determination is not caused even when an error range of about ±2m is taken into consideration. When the layer map data 200-$j$ corresponding to the vertical position H of the target vehicle 1T already exist in the unsprung displacement map 200 (Step S22; Yes), the processing proceeds to Step S23. Otherwise (Step S22; No), the processing proceeds to Step S40.

In Step S23, the control device 70 selects the existing layer map data 200-$j$ corresponding to the vertical position H of the target vehicle 1T. After that, the processing proceeds to Step S30.

In Step S30, the control device 70 performs vehicle control utilizing the unsprung displacement map 200. More specifically, the control device 70 acquires the unsprung displacement Zu from the layer map data 200-$j$ selected in Step S23. Then, the control device 70 performs the vehicle control of the target vehicle 1T based on the acquired unsprung displacement Zu. For example, the vehicle control is the preview control (see FIGS. 9 and 10). Since the unsprung displacement Zu of the road on which the target vehicle 1T is actually traveling in the multi-level crossing is correctly obtained, it is possible to appropriately perform the vehicle control.

In Step S40, the control device 70 performs vehicle control that does not utilize the unsprung displacement map 200. For example, the control device 70 performs well-known vibration suppression control based on feedback control. A gain of the well-known vibration suppression control may be set to be larger than usual.

5-4. Effects

As described above, according to the present embodiment, the unsprung displacement map 200 that supports the multi-level crossing as well is provided.

Moreover, the data amount of the unsprung displacement map 200 according to the present embodiment is smaller than in the case of a complete three-dimensional map. This is preferable in terms of suppression of the storage resources, the communication resources, and the computational resources. By making only the unsprung displacement map 200 for the specific area SA multi-layered, it is possible to suppress the data amount of the unsprung displacement map 200.

Furthermore, the vehicle control in the multi-level crossing is performed by utilizing the unsprung displacement map 200 according to the present embodiment. Since the unsprung displacement Zu of the road on which the target vehicle 1T is actually traveling is correctly obtained, it is possible to appropriately perform the vehicle control even in the multi-level crossing.

5-5. Modification Example

5-5-1. First Modification Example

FIG. 17 is a conceptual diagram for explaining a first modification of the unsprung displacement map 200 for the specific area SA. The data structure of the unsprung displacement map 200 for the specific area SA may include only one of the first layer map data 200-1 and the second layer map data 200-2 and may not include the other.

As an example, consider a case where, in the specific area SA, reliability (accuracy) of the position information 94 of the vehicle 1 on the second road R2 is higher than reliability of the position information 94 of the vehicle 1 on the first road R1. For example, the second road R2 exists above the first road R1 in the specific area SA (see FIG. 11). When the position information 94 is obtained based on the measurement by the GNSS, the reliability (accuracy) of the position information 94 of the vehicle 1 on the second road R2 is higher than the reliability of the position information 94 of the vehicle 1 on the first road R1. Therefore, the second layer map data 200-2 may take a priority. That is, as shown in FIG. 17, the data structure of the unsprung displacement map 200 for the specific area SA may include only the second layer map data 200-2 without including the first layer map data 200-1. This makes it possible to further reduce the data amount of the unsprung displacement map 200.

As another example, consider a case where, in the specific area SA, a representative value of the unsprung displacement Zu regarding the second road R2 is greater than a representative value of the unsprung displacement Zu regarding the first road R1. Examples of the representative value include an average value, a maximum value, and the like. A greater vibration suppression effect is expected on the second road R2 where the unsprung displacement Zu is greater. Therefore, the second layer map data 200-2 may take a priority. That is, the data structure of the unsprung displacement map 200 for the specific area SA may include only the second layer map data 200-2 without including the first layer map data 200-1. This makes it possible to further reduce the data amount of the unsprung displacement map 200.

5-5-2. Second Modification Example

In a second modification example, the unsprung displacement map 200 for the specific area SA has a "specific area flag" instead of the information of the vertical position H and the unsprung displacement Zu. When the specific area flag is read out from the unsprung displacement map 200, the vehicle control using the unsprung displacement map 200 is not performed. Instead, vehicle control not using the unsprung displacement map 200 may be performed (Step S40).

What is claimed is:

1. A non-transitory computer-readable recording medium on which map data regarding a vertical motion parameter related to a vertical motion of a wheel of a vehicle are recorded, the map data comprising a data structure for a specific area in which a first road and a second road cross with being separated vertically, and another data structure for an area other than the specific area, wherein the data structure for the specific area includes at least one of:
  first layer map data indicating a correspondence relationship between a horizontal position, a vertical position, and the vertical motion parameter of the first road; and
  second layer map data indicating a correspondence relationship between a horizontal position, a vertical position, and the vertical motion parameter of the second road, and
the another data structure for the area other than the specific area includes a single piece of layer map data indicating at least a correspondence relationship between a horizontal position and the vertical motion parameter of a road.

2. The non-transitory computer-readable recording medium according to claim 1, wherein
the data structure for the specific area includes both of the first layer map data and the second layer map data.

3. The non-transitory computer-readable recording medium according to claim 1, wherein
in the specific area, reliability of position information of the vehicle on the second road is higher than reliability of position information of the vehicle on the first road, and
the data structure for the specific area includes the second layer map data without including the first layer map data.

4. The non-transitory computer-readable recording medium according to claim 1, wherein
in the specific area, a representative value of the vertical motion parameter regarding the second road is greater than a representative value of the vertical motion parameter regarding the first road, and
the data structure for the specific area includes the second layer map data without including the first layer map data.

5. The non-transitory computer-readable recording medium according to claim 1, wherein
the horizontal position is defined for each first unit area in a horizontal plane,
the vertical position is defined for each second unit area in the horizontal plane, and
the second unit area is larger than the first unit area.

6. The non-transitory computer-readable recording medium according to claim 1, wherein
vehicle control of a target vehicle is performed based on the vertical motion parameter acquired from the map data.

7. The non-transitory computer-readable recording medium according to claim 6, wherein
when the vehicle control of the target vehicle is performed in the specific area, whether or not layer map data corresponding to a vertical position of the target vehicle exist in the map data is determined, and
when the layer map data corresponding to the vertical position of the target vehicle exist, the vertical motion parameter is acquired from the layer map data corresponding to the vertical position of the target vehicle.

8. A map updating method for updating map data regarding a vertical motion parameter related to a vertical motion of a wheel of a vehicle,
the map updating method comprising updating the map data based on time-series data of a wheel position and time-series data of the vertical motion parameter, wherein
the map data have a data structure for a specific area in which a first road and a second road cross with being separated vertically,
the data structure for the specific area includes at least one of:
  first layer map data indicating a correspondence relationship between a horizontal position, a vertical position, and the vertical motion parameter of the first road; and
  second layer map data indicating a correspondence relationship between a horizontal position, a vertical position, and the vertical motion parameter of the second road, and
the updating the map data includes:
  determining whether or not layer map data corresponding to a vertical position of the wheel position exist in the map data; and
  when the layer map data corresponding to the vertical position of the wheel position exist, selecting and updating the layer map data corresponding to the vertical position of the wheel position.

9. A vehicle control method comprising:
acquiring map data regarding a vertical motion parameter related to a vertical motion of a wheel of a vehicle; and
controlling a target vehicle based on the vertical motion parameter acquired from the map data, wherein
the map data have a data structure for a specific area in which a first road and a second road cross with being separated vertically,
the data structure for the specific area includes at least one of:
  first layer map data indicating a correspondence relationship between a horizontal position, a vertical position, and the vertical motion parameter of the first road; and
  second layer map data indicating a correspondence relationship between a horizontal position, a vertical position, and the vertical motion parameter of the second road, and
the controlling the target vehicle in the specific area includes:
  determining whether or not layer map data corresponding to a vertical position of the target vehicle exist in the map data; and
  when the layer map data corresponding to the vertical position of the target vehicle exist, acquiring the vertical motion parameter from the layer map data corresponding to the vertical position of the target vehicle.

* * * * *